US008819740B2

(12) United States Patent
Hutcheson

(10) Patent No.: US 8,819,740 B2
(45) Date of Patent: Aug. 26, 2014

(54) METHOD AND SYSTEM FOR PROVIDING INTERACTIVE SERVICES OVER A WIRELESS COMMUNICATIONS NETWORK

(75) Inventor: S. Douglas Hutcheson, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 11/635,804

(22) Filed: Dec. 7, 2006

(65) Prior Publication Data

US 2007/0180477 A1    Aug. 2, 2007

Related U.S. Application Data

(63) Continuation of application No. 09/989,985, filed on Nov. 21, 2001, now abandoned.

(60) Provisional application No. 60/252,468, filed on Nov. 22, 2000.

(51) Int. Cl.
*H04N 7/16*           (2011.01)

(52) U.S. Cl.
USPC .................. 725/62; 725/24; 725/81; 725/86; 725/88; 725/123; 463/41

(58) Field of Classification Search
USPC ............... 725/24, 62, 81, 86, 88, 123; 463/41
See application file for complete search history.

(56) References Cited

U.S. PATENT DOCUMENTS

| 4,850,007 | A | | 7/1989 | Marino et al. |
| 4,918,601 | A | * | 4/1990 | Vermesse ...................... 705/411 |
| 5,396,225 | A | | 3/1995 | Okada et al. |
| 5,586,937 | A | | 12/1996 | Menashe |
| 5,618,045 | A | | 4/1997 | Kagan et al. |
| 5,738,583 | A | * | 4/1998 | Comas et al. .................... 463/40 |
| 5,809,415 | A | | 9/1998 | Rossmann |
| 5,820,463 | A | | 10/1998 | O'Callaghan et al. |
| 5,848,396 | A | | 12/1998 | Gerace |
| 5,852,775 | A | | 12/1998 | Hidary |
| 5,899,855 | A | | 5/1999 | Brown |
| 5,905,865 | A | | 5/1999 | Palmer et al. |
| 5,918,603 | A | | 7/1999 | Brown |
| 5,937,037 | A | | 8/1999 | Kamel et al. |
| 5,942,969 | A | | 8/1999 | Wicks |

(Continued)

FOREIGN PATENT DOCUMENTS

| EP | 1066867 A2 | 1/2001 |
| EP | 1066868 A2 | 1/2001 |

(Continued)

*Primary Examiner* — Joshua Taylor

(74) *Attorney, Agent, or Firm* — Blakely, Sokoloff, Taylor & Zafman LLP

(57) ABSTRACT

A system for providing one or more interactive applications to one or more users via a wireless communications network, the system including: one or more servers cooperating with the network to substantially deliver one or more interactive applications to one or more wireless access devices each corresponding to at least one of the users; wherein, after the one or more wireless access devices receive the substantially delivered one or more applications, upon request of one of the users the one or more corresponding wireless access devices receives communication from the server to facilitate the one of the users accessing the one or more interactive applications using the corresponding wireless access device.

25 Claims, 8 Drawing Sheets

(56) References Cited

U.S. PATENT DOCUMENTS

| | | | | |
|---|---|---|---|---|
| 5,959,596 | A | 9/1999 | McCarten et al. | |
| 5,970,143 | A | 10/1999 | Schneier et al. | |
| 5,991,735 | A | 11/1999 | Gerace | |
| 6,009,150 | A | 12/1999 | Kamel | |
| 6,024,643 | A | 2/2000 | Begis | |
| 6,038,599 | A | 3/2000 | Black et al. | |
| 6,042,477 | A | 3/2000 | Addink | |
| 6,050,898 | A | 4/2000 | Vange et al. | |
| 6,055,510 | A | 4/2000 | Henrick et al. | |
| 6,078,789 | A | 6/2000 | Bodenmann et al. | |
| 6,101,381 | A | 8/2000 | Tajima et al. | |
| 6,104,837 | A * | 8/2000 | Walker | 382/239 |
| 6,113,494 | A | 9/2000 | Lennert | |
| 6,113,495 | A | 9/2000 | Walker et al. | |
| 6,128,660 | A | 10/2000 | Grimm et al. | |
| 6,132,315 | A | 10/2000 | Miyamoto et al. | |
| 6,134,532 | A | 10/2000 | Lazarus et al. | |
| 6,134,590 | A | 10/2000 | Perlman | |
| 6,157,841 | A | 12/2000 | Bolduc et al. | |
| 6,181,927 | B1 | 1/2001 | Welling, Jr. et al. | |
| 6,208,866 | B1 | 3/2001 | Rouhollahzadeh et al. | |
| 6,216,129 | B1 | 4/2001 | Eldering | |
| 6,223,291 | B1 | 4/2001 | Puhl et al. | |
| 6,238,291 | B1 | 5/2001 | Fujimoto et al. | |
| 6,310,505 | B1 | 10/2001 | Ogawa et al. | |
| 6,314,572 | B1 * | 11/2001 | LaRocca et al. | 725/60 |
| 6,315,668 | B1 | 11/2001 | Metke et al. | |
| 6,343,313 | B1 * | 1/2002 | Salesky et al. | 709/204 |
| 6,352,479 | B1 | 3/2002 | Sparks, II | |
| 6,353,839 | B1 | 3/2002 | King et al. | |
| 6,361,440 | B1 | 3/2002 | Ogawa et al. | |
| 6,371,854 | B1 | 4/2002 | Ikeda et al. | |
| 6,383,075 | B1 | 5/2002 | Jeong et al. | |
| 6,416,414 | B1 | 7/2002 | Stadelmann | |
| 6,434,378 | B1 * | 8/2002 | Fougnies | 455/406 |
| 6,453,029 | B1 * | 9/2002 | Campbell | 379/114.2 |
| 6,453,160 | B1 * | 9/2002 | Thomas et al. | 455/419 |
| 6,463,078 | B1 | 10/2002 | Engstrom et al. | |
| 6,477,573 | B1 | 11/2002 | Lea | |
| 6,511,378 | B1 | 1/2003 | Bhatt et al. | |
| 6,524,189 | B1 | 2/2003 | Rautila | |
| 6,587,441 | B1 | 7/2003 | Urban et al. | |
| 6,677,858 | B1 | 1/2004 | Faris et al. | |
| 6,680,922 | B1 | 1/2004 | Jorgensen | |
| 6,684,062 | B1 | 1/2004 | Gosior et al. | |
| 6,699,125 | B2 | 3/2004 | Kirmse et al. | |
| 6,716,103 | B1 * | 4/2004 | Eck et al. | 463/45 |
| 6,719,631 | B1 | 4/2004 | Tulley et al. | |
| 6,726,567 | B1 | 4/2004 | Khosla | |
| 6,765,925 | B1 | 7/2004 | Sawyer et al. | |
| 6,785,561 | B1 | 8/2004 | Kim | |
| 6,877,096 | B1 | 4/2005 | Chung et al. | |
| 6,985,494 | B2 * | 1/2006 | Thompson | 370/466 |
| 7,076,556 | B1 | 7/2006 | Brock et al. | |
| 7,376,728 | B1 | 5/2008 | Motoyama et al. | |
| 7,574,493 | B2 | 8/2009 | Hutcheson et al. | |
| 8,024,434 | B2 | 9/2011 | Hutcheson et al. | |
| 2001/0005839 | A1 | 6/2001 | Maenpaa et al. | |
| 2001/0011248 | A1 | 8/2001 | Himmel et al. | |
| 2001/0013037 | A1 | 8/2001 | Matsumoto | |
| 2001/0014911 | A1 | 8/2001 | Doi et al. | |
| 2002/0052239 | A1 | 5/2002 | Finn | |

FOREIGN PATENT DOCUMENTS

| | | |
|---|---|---|
| EP | 1086732 A1 | 3/2001 |
| EP | 1087323 A1 | 3/2001 |
| WO | WO 98/17359 A | 4/1998 |
| WO | WO 00/35216 A1 | 6/2000 |
| WO | WO 01/31476 A1 | 5/2001 |

* cited by examiner

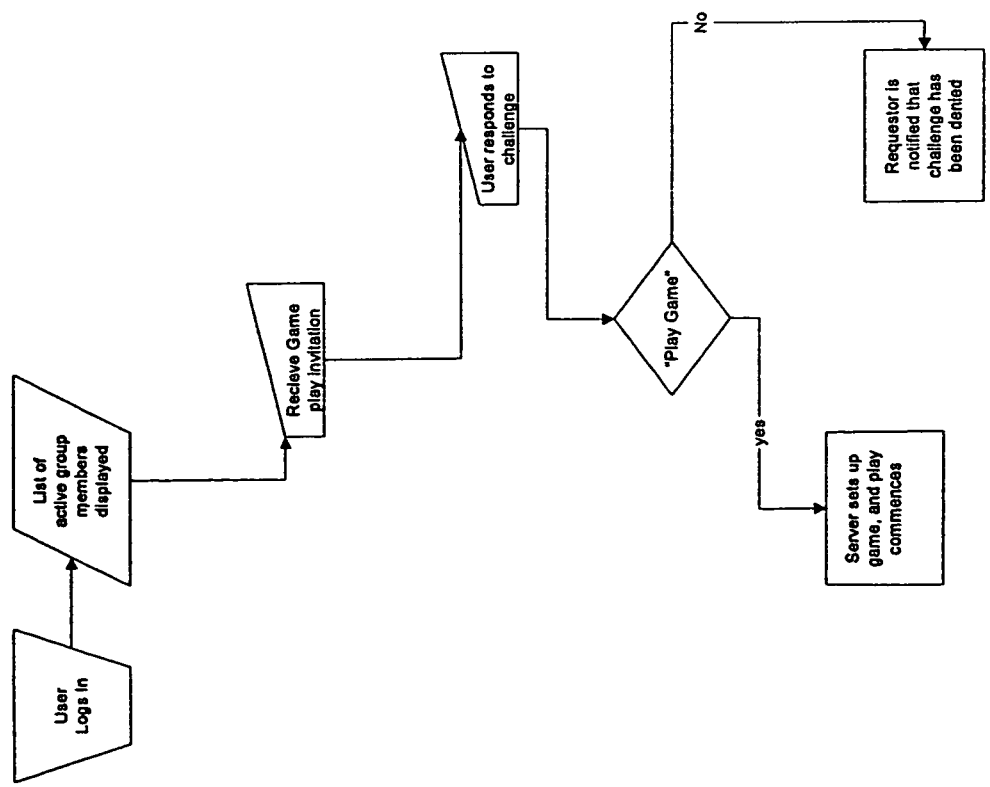

METHOD AND SYSTEM FOR PROVIDING INTERACTIVE SERVICES OVER A WIRELESS COMMUNICATIONS NETWORK

RELATED APPLICATIONS

This Application claims the benefit of and is a continuation of U.S. patent application Ser. No. 09/989,985, entitled "METHOD AND SYSTEM FOR PROVIDING INTERACTIVE SERVICES OVER A WIRELESS COMMUNICATIONS NETWORK" filed Nov. 21, 2001 now abandoned, which claims the benefit of U.S. provisional patent application Ser. No. 60/252,468 entitled "METHOD AND SYSTEM FOR PROVIDING INTERACTIVE SERVICES OVER A WIRELESS COMMUNICATIONS NETWORK" filed on Nov. 22, 2000.

FIELD OF THE INVENTION

The present invention generally relates to a method and system for providing interactive services via a communications network, and in particular to using telecommunications network resources and wireless, interactive application protocols.

BACKGROUND OF THE INVENTION

The interactive entertainment market is a fast growing segment of the entertainment industry. By 1998, the market had experienced its third straight year of double digit growth. In 1998 alone, video game sales exceeded $3.7 billion and computer games sales exceeded $1.8 billion. In 1998 alone, about 181 million units of PC and video games were sold in the United States.

From the early 1960's, interactive entertainment services ranged from mainframe, to video, and PC-based platforms. Sony, Nintendo and Sega, among others, have introduced interactive entertainment systems.

In 1989, Nintendo launched its popular Game Boy series of handheld interactive game devices. Nintendo released their Color Game Boy device in 1999. Although Nintendo's Game Boy series has not generally employed the most advanced technology available, it has adapted the available technology to meet the specific demands of the gaming market. For example, rather than using the higher resolution display devices available, Nintendo has adopted lower resolution screens, providing greatly extended battery life. It is believed that by June 2000, Nintendo had sold over 100,000,000 Game Boy units.

Due to its improved graphics quality and quality of the playing experience, implementing graphics quality comparable to the Nintendo Game Boy Advance system would impose even greater network bandwidth and resource demands than those associated with Gameboy, if deployed over a wireless network of the type and in a manner conventionally known.

BRIEF SUMMARY OF THE INVENTION

A system for providing one or more interactive applications to one or more users via a wireless communications network, the system including: one or more servers cooperating with the network to substantially deliver one or more interactive applications to one or more wireless access devices each corresponding to at least one of the users; wherein, after the one or more wireless access devices receive the substantially delivered one or more applications, upon request of one of the users the one or more corresponding wireless access devices receives communication from the server to facilitate the one of the users accessing the one or more interactive applications using the corresponding wireless access device.

BRIEF DESCRIPTION OF THE DRAWINGS

The present invention will now be described in connection with the following figures in which like reference numbers refer to like elements and wherein:

FIG. 8 is a flowchart depicting the steps of a user receiving an invitation to play a game according to one embodiment of the present invention.

DETAILED DESCRIPTION OF THE PREFERRED EMBODIMENTS

Figure 1:
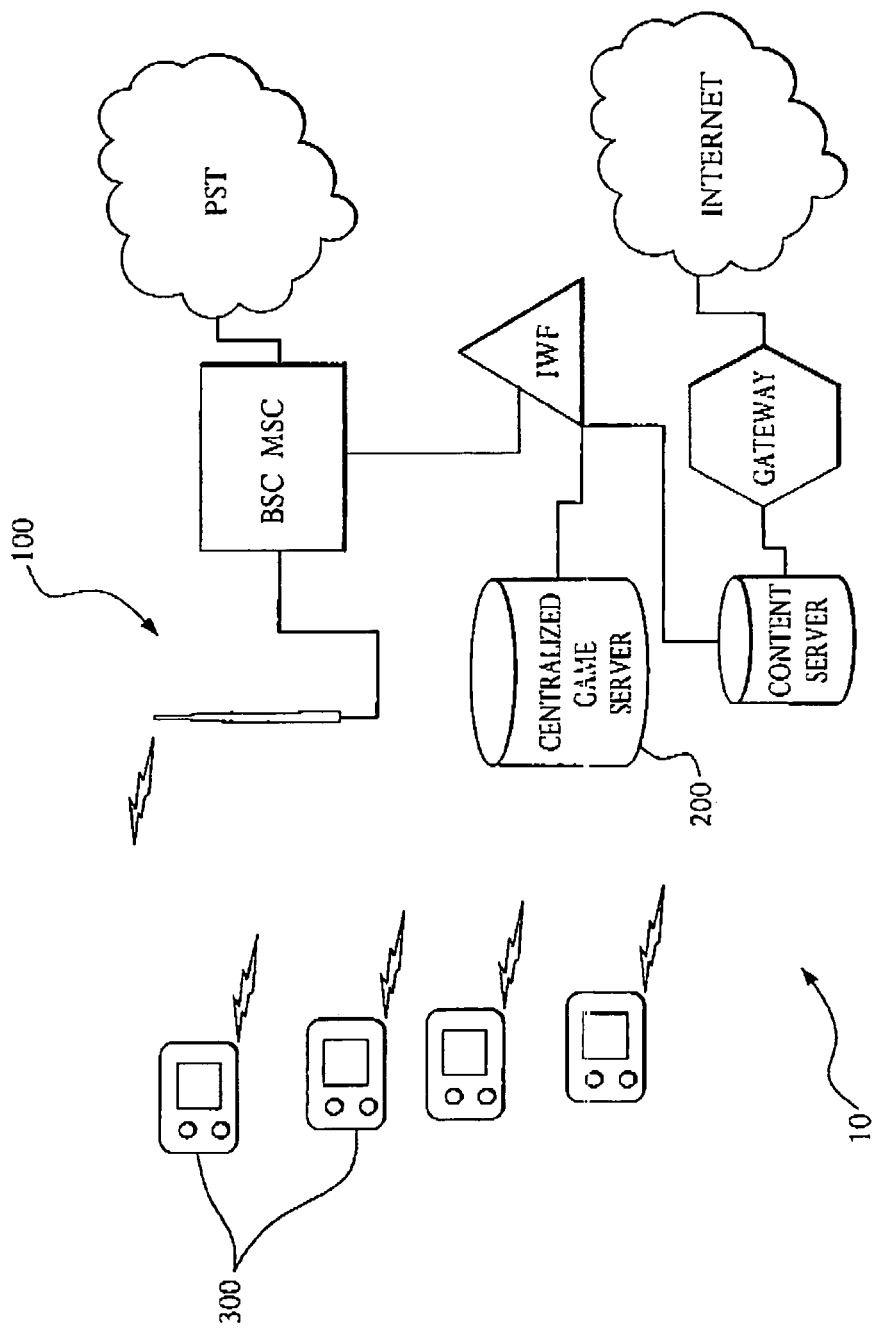
FIG. 1 is a diagram of the relationship of the elements of the invention in one embodiment of the present invention.

It is to be understood that the figures and descriptions of the present invention have been simplified to illustrate elements that are relevant for a clear understanding of the present invention, while eliminating, for purposes of clarity, many other elements found in a typical telecommunications system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention addresses delivering a rich, interactive, game experience over a network, such as a wireless network (CDMA type, for example), efficiently and cost effectively. In particular, the present invention offers an interactive experience, in which the action occurs in real time. The present invention features enhanced, state-of-the-art graphics. Moreover, by managing network traffic efficiently and effectively, the present invention conserves network capacity and offers the network operator and user cost savings advantages. This opens the possibilities to provide a wireless game service to end users at a flat monthly rate rather than a per unit of time consumed basis. In this regard the pricing model of Assignee's Cricket wireless telecommunications services may be adopted.

As embodied herein, the present innovation provides a means for distributing interactive services, such as multi player games, using a wireless network (CDMA type, for example). According to an aspect of the present invention, a wireless network and method of communicating between the gaming device and the wireless network that distributes information in a manner that provides the user a smooth and robust experience may be provided.

According to an aspect of the present invention, a system may include: a wireless network, one or more servers, and one or more handheld devices. The wireless network of the present invention may be data capable, as opposed to a first generation cellular (voice only) network. The network may be based upon PCS, TDMA, CDMA, or other suitable data capable technology(ies) or standard(s). A server of the present invention may include: software and means to maintain the interactive applications in synchronization with the network. The wireless handheld device(s) of the present invention may include: applications software; and sufficient memory to accomplish the purpose of the invention to offer improved efficiency of communication with the wireless network. The handheld device may take the form of a phone, a portable gaming device, or another appropriate device. In one respect, the present invention differs from prior known systems and devices in that significant software resources may be loaded and stored on the handheld device, rather than having to be delivered over the wireless network to the handheld device, upon demand, for example.

In addition, according to an aspect of the present invention, various options and enhancements that add to the users' enjoyment may be included, such as chat, Internet browsing, instant messaging, e-commerce and m-commerce services, and other interactive entertainment and/or communication services.

In addition to the software and clock functions, the server may provide: compression algorithms; prioritization algorithms; and Internet and intranet access capability. Similarly, the handheld device of the present invention may include: enhanced graphics; enhanced clock speed; improved refresh rate (similar to that of a GameBoy, for example); a handheld device that is ergonomically suited for gaining; color graphics; high resolution; long battery life; an enhanced processor; expanded memory (16 Mb, for example); be expandable (using expansion slots, for example); enhanced features, such as tremble; speakers; microphone; camera; a web browser; text entry system; chat; simultaneous voice; and be modular or integrated, for example.

The present invention provides a robust, high resolution, interactive, wireless system and method, that uses network resources more efficiently than prior known systems. It is therefore desirable to develop an efficient, high quality, interactive gaming system that overcomes the disadvantages and limitations of prior known systems and devices.

According to an aspect of the present invention, market penetration of interactive wireless services may be achieved and improved. According to an aspect of the present invention, the cost to the system operator of wireless game service may be reduced.

According to an aspect of the present invention, a degree to which interactive wireless services are network dependent may be reduced. According to an aspect of the present invention, a degree to which interactive wireless services are time of day dependent may be reduced. According to an aspect of the present invention, an availability of interactive wireless services may be increased.

According to an aspect of the present invention, network capacity may be efficiently utilized. According to an aspect of the present invention, network capacity may be efficiently utilized for interactive wireless gaming applications. According to an aspect of the present invention, an interactive application may be adjusted to substantially match applicable data transfer requirements of the wireless network. According to an aspect of the present invention, a substantial amount of the software required to operate the interactive application may be maintained on a personal handset device as opposed to the network. According to an aspect of the present invention, a substantial amount of the instructions required to operate the interactive application may be maintained on a personal handset device as opposed to the network, in order to reduce network traffic.

According to an aspect of the present invention, wireless transmissions between the network and the personal device may be adapted to reduce latency. According to an aspect of the present invention, a latency of the response of the interactive application may be limited. According to an aspect of the present invention, a reduced cost interactive service may be achieved. According to an aspect of the present invention, a perceived speed of interactive use may be increased. According to an aspect of the present invention, differences in latency between users of the interactive service may be reduced and a substantially consistent level of latency between users of the interactive service may be achieved. According to an aspect of the present invention, a substantially even playing field for the interactive services may be provided. According to an aspect of the present invention, differentials that may exist between users of the interactive service based upon differences in download or modem speed between the portable handheld devices may be at least partially mitigated. According to an aspect of the present invention, a cost effective way to deliver interactive services to end users may be provided. According to an aspect of the present invention, an interactive gaming community may be supported. According to an aspect of the present invention, a system may provide one or more wireless interactive applications to one or more users.

According to an aspect of the present invention, a system may include: a wireless communication network; one or more servers, cooperating with the network to deliver one or more interactive application(s) to the one or more users; and one or more wireless access devices in communication with said network. The one or more wireless access devices may receive communication from the server to facilitate the users accessing the one or more wireless interactive applications on the wireless access device.

According to an aspect of the present invention, the system may include: a wireless communication network; an interactive application delivered over the wireless network to one or more users; one or more wireless access devices adapted to receive and render the interactive application to the user; control means for controlling the state of the interactive application; and network mediation means for controlling delivery of the interactive application to the one or more users.

According to an aspect of the present invention, the system may include: a wireless communication network adapted for transmission of communications to facilitate the one or more interactive applications at less than the full frame rate of voice communications; and one or more servers, cooperating with the network to deliver one or more interactive application(s) to the one or more users. The system may also include one or more wireless access devices, in communication with the network. The one or more wireless access devices may receive communications from the server to facilitate the users accessing the one or more wireless interactive applications on the wireless access device. The one or more interactive applications may further comprise high resolution game applications featuring substantially high resolution graphics, and may reside on the wireless access device.

According to an aspect of the present invention, and as is illustrated in the accompanying diagrams and disclosed in the accompanying claims, a system may be used for providing one or more wireless interactive applications to one or more users. The system may include: a wireless communication network; one or more servers operating with the network to deliver one or more interactive application(s) to the one or more users; and one or more wireless access devices, in communication with the network. The one or more wireless access devices receive communication from the server to facilitate users accessing the one or more wireless interactive applications.

According to an aspect of the present invention, a system may be used for providin one or more wireless interactive applications to one or more users. The system may include a wireless communication network adapted for transmission of communications to facilitating the one or more interactive applications at less than the full frame rate of voice communications, and one or more servers, cooperating with the network to deliver one or more interactive application(s) to the one or more users. The system may also include one or more wireless access devices, in communication with the network. The one or more wireless access devices may receive communications from the server to facilitate users accessing the one or more wireless interactive applications. The one or more interactive applications may further include high resolution game applications featuring high resolution graphics, and may reside on the wireless access device.

According to an aspect of the present invention, a method for providing one or more interactive applications to one or more users of a wireless communication network may be used. According to an aspect of the present invention, initiating a request for wireless interactive services to the network, sending communications to the network to request the interactive application, compiling the request and communicating to a wireless access device software necessary to perform the one or more interactive application, and initiating the interactive application may be performed. A method may further include communicating to the network one or more degrees of freedom of the interactive application, storing information about changes in state of one or more of the degrees of freedom caching the information, communicating the cached information to the server in order to efficiently utilize network resources (said wireless access device communicating signals reflecting the change of state of the interactive application), maintaining one or more interactive applications on the server, synchronizing the interactive applications among the users, and communicating updates to the one or more interactive applications until play is concluded or terminated.

It will be apparent to persons of ordinary skill in the art that modification and variations may be made in the present invention. For example, one or more interactive applications according to the present invention may include a latency of less than about 30s, less than about 10s, less than about 1s, less than about 500 ms, less than about 300 ms, and/or less than about 200 ms. One or more interactive applications according to the present invention may also include high resolution graphics.

Furthermore, the wireless access device according to the present invention may include a handheld device. The wireless access device may further include an 8 bit microprocessor having a clock speed of greater than about 4 MHz. The wireless access device may further include: greater than about 256 kbit memory, greater than about 512 kbit memory, greater than about 1 Mbit memory, greater than about 2 Mbit memory, greater than about 4 Mbit memory, and/or greater than about 8 Mbit memory.

The wireless access device according to the present invention may further include a video display in excess of 160×144 pixels and may include a color display. The color display may be capable of rendering more than about 256 colors, 2,000 colors, 24,000 colors, 32,000 colors, or 64,000 colors. The wireless access device may include battery power source sufficient to power the device for more than about 30 hours. In addition, the wireless access device may include a 16 bit microprocessor, a 32 bit microprocessor, and/or a 32 bit RISC microprocessor. The microprocessor may have a clock speed of greater than about 8 MHz, and may have a clock speed of greater than 16 Mhz. The memory of the microprocessor may be external to the microprocessor. In addition, the wireless access device may include VRAM and/or WRAM memory. The wireless access device according to the present invention may further include a video display in excess of 240×160 pixels.

Users of a system according to the present invention may include up to eight or more simultaneous users. In addition, a system according to the present invention may conserve network resources relative to voice traffic. Communication from the network to the wireless access device may occur at a full frame rate. Moreover, communications from the network to the wireless access device may occur at a half frame rate.

Furthermore, a wireless access device according to the present invention may cache information regarding the interactive application and dispatch the communications to ensure efficient use of the network. In addition, an application feature according to the present invention may offer a user more than three degrees of freedom. An application feature may reside on the wireless access device.

It is intended that the present invention include the variations and modification that may be used in conjunction with them, provided they, come within the scope of the appended claims and their equivalents.

It is to be understood that both the foregoing general description and the following detailed description are exemplary and explanatory only, and are not restrictive of the invention as claimed. The accompanying drawings, which are incorporated herein by reference, and constitute a part of the specification, illustrate certain embodiments of the invention, and together with the detailed description, serve to explain the principles of the present invention.

Reference will now be made in detail to a preferred embodiment of the method and system of the present invention, an example of which is illustrated in the accompanying drawings. A preferred embodiment of the present invention is shown in FIG. 1 as system 10.

System 10 may include: wireless network 100, a centralized game server 200, and wireless access device 300. Wireless network 100 may further include any suitable, data-capable wireless communications network. This includes, without limitation, any networks of the type known prior to the present invention, whether based upon PCS, TDMA, CDMA, or other technology, provided that technology provides a data enabled wireless network. The wireless network 100 of the present invention may be any advanced or improved data-capable network, such as 2.5 G or 3 G networks, as well as any further improvements in network technology. The present inventors consider any wireless network to be appropriate for use with the present invention, provided it is not a pure cellular network that lacks the capacity to transfer data.

Server 200 of the system 10 may include: software (not shown), and synchronization means (not shown). Synchronization means may include a clock.

Wireless access device 300 may include any suitable means for providing access to an interactive application over a wireless communications network. For example, a wireless access device may be a Game Boy or comparable device, a wireless phone, or any other device through which the user can interface with the interactive application over the wireless network. Wireless access device 300 may further include: software (not shown), and memory (not shown).

According to an aspect of the present invention, one or more users may access interactive applications (not shown) through the wireless access device 300. A user may activate the wireless access device 300 by initiating a communication with the wireless network 100. The user may select an application, causing server 200 to deliver the appropriate software to wireless access device 300 through a wireless communication over network 100. As embodied herein, the interactive application may provide a high quality interactive experience, at a degree of interactivity and graphic resolution comparable to or greater than that provided by a Game Boy gaming device, for example. The interactive application may reside substantially in the handheld device 300 rather than server 200 or other wireless network 100 component. This enables the system to reduce the amount of wireless communication traffic necessary to facilitate the interactive service.

According to an aspect of the present invention, an interactive application may be delivered that features updates at a rate of at least once per second, and preferably more frequently than about three times per second. The graphic resolution of the wireless access device may be better than about 160×140 pixels, and preferably better than about 240×160 pixels. In addition the present invention may offer a substantially real-time, interactive experience.

According to an aspect of the present invention, the system 10 may includes: a CDMA wireless communications network 100, server 200 adapted for coordination of the interactive applications, and wireless access device 300, adapted for high resolution, real time, interactive applications.

It will be apparent to persons of ordinary skill in the art that various modifications may be made to the present invention without departing from the scope or spirit of the invention. For example, the wireless network 100 may employ any wireless network having data capability. Server 200 of the present invention may also include compression algorithms for reducing the size of the wireless communications required to facilitate the application; prioritization algorithms to speed certain communications; and Internet and Intranet access capability. The server 200 may be built on any suitable, conventional technology. Handheld device 300 of the present invention may include any of an number of enhancements including, without limitation: enhanced graphics; variable or enhanced clock speed; variable or enhanced refresh rate; ergonomic design, particularly adapted for gaming; color; enhanced resolution; long battery life; enhanced processor capability; enhanced memory (16 M or greater); expandable memory—whether based upon chips, cards, expansion slots or other suitable technology; tremble function; speakers; microphone; camera; video; Web Browser; text entry and editing system; chat; simultaneous voice; modular components (preferred) or integrated components (alternative). It is intended that the present invention include each of the above enhancements and modifications and variations, provided they come within the scope of the appended claims and their equivalents.

According to an aspect of the present invention, a method of using one embodiment of the system 10 of the present invention may include enabling the handheld device 300, and initiating a request for wireless interactive services to the network 100, whether initiated by the user, or in response to an anonymous challenge of specific request; sending data messages to network 100 to request game. In response, server 200 may compile the request and dispatch software necessary to run the interactive application. Server 200 may then initiate a game, sending a ready signal to each participant and play begins. Each client may move—having up to about 20 degrees of freedom in a preferred embodiment of the interactive application, for example. The handheld device 300 may store signals and cache instructions to the server 200 in order to utilize network resources more efficiently. Handheld devices 300 may send signals substantially only reflecting the change of state until frame is full (or $\frac{1}{3}$ second goes by) whichever occurs first, for example. Server 200 may receive inputs, maintain state of game, and synchronize the clients (at a rate that ensures minimum latency, for example).

Server 200 may broadcast updates until the application is concluded or terminated.

The foregoing steps may be altered. In addition, the above description is merely illustrative of one preferred method of using the invention and is not intended to limit the invention as disclosed and claimed.

It will be apparent to persons of ordinary skill in the art that various modifications and variations may be made in the process of the present invention. For example, handheld device 300 may take the form of any appropriate wireless attachment or device. Interactive applications may be initiated either directly by the user, by a buddy, anonymously, or by the server. The system may be capable of building and retaining a profile of the user. The system may provide access to a gaming community. The user may be offered a choice of gaming options. The user may be allowed to download applications, particularly data intensive applications, overnight, when network capacity is higher. The system may be available in an always-on mode to provide instant messaging and other interactive services. The system may provide the user the option of initiating play based upon interactions with a text message, or player, or server. Scores may be posted. Awards, premiums, free play and other incentives may be offered. Tournaments may be held and prizes awarded. Thus, it is intended that the present invention include these variations and modifications, provided they come within the scope of the appended claims and their equivalents.

According to an aspect of the present invention, a choice of an appropriate wireless air interface (CDMA, for example) allows the operator to optimize a game service. It is believed that the use of a CDMA network, relative to other currently known and used technologies, provides a high quality game experience, with low and consistent latency, utilizing limited bandwidth, that is highly efficient, which leads to low cost to the service. Since the wireless airlink bandwidth resource is utilized by a variety of services, it is important to preserve as much capacity (bandwidth) as possible. This maintains the network in an efficient and cost effective manner.

Figure 2:
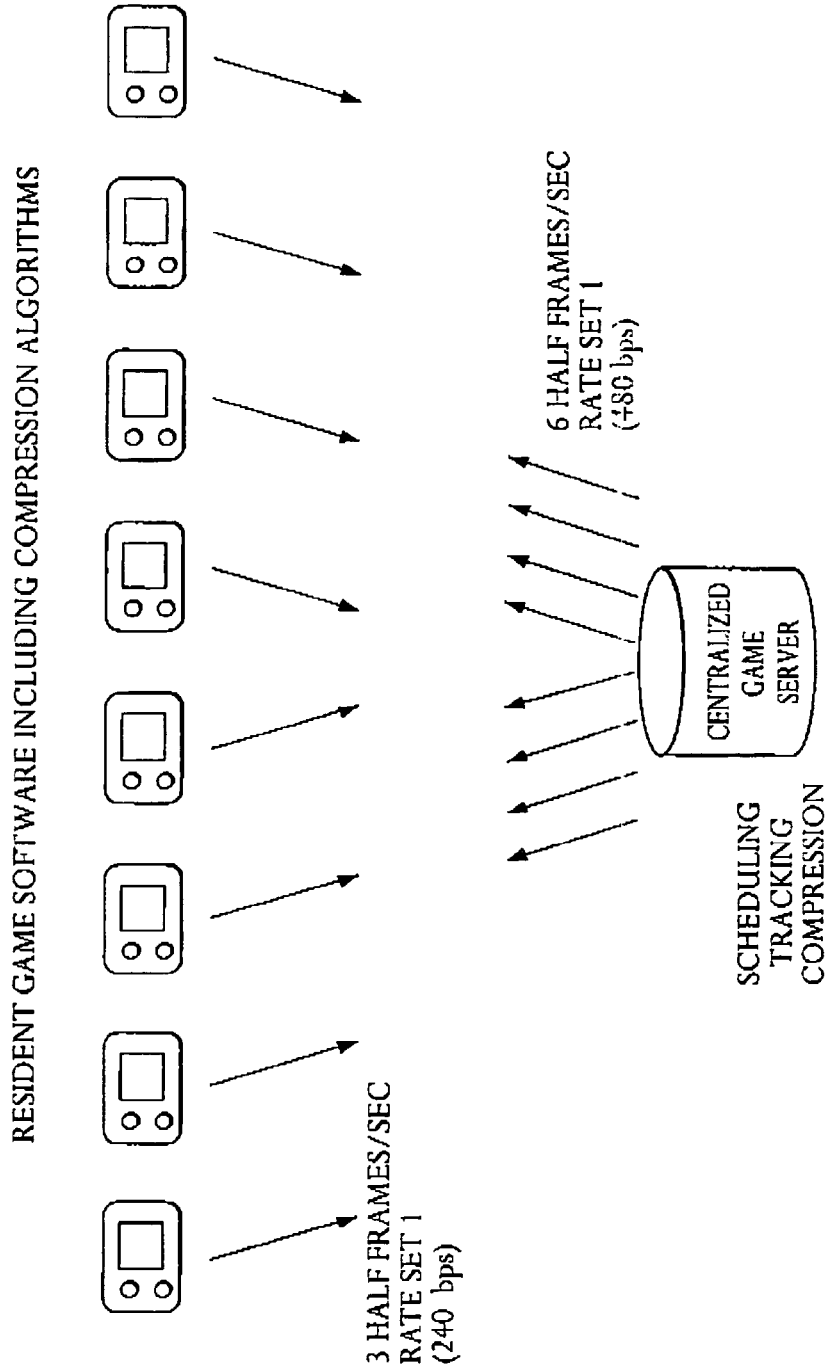
FIG. 2 is a diagram of the relationship of the data transfer rate between the handheld devices and network of the present invention.

According to an aspect of the present invention, in order to allow for a high quality service, the actual application software may be resident on the device, as shown in FIG. 2. This includes, but is not limited to, the graphics, instructions, transmission algorithms and compression algorithms. With this loaded (e.g., downloaded via the wireless network at low usage times, or distributed in form to be loaded onto the devices, or downloaded over any manner of data transmission) on the game device, interactive play may only require a relatively bare minimum of information to be transmitted to the other players (via the game server).

The minimum information that preferably is transmitted between the network 100 and the handheld device 300 may be limited to actions that can take place. These actions may be separated into degrees of freedom (i.e. move up/down, move left/right, fire weapon, for example). When one of these degrees of freedom changes, the server may need to be notified by the resident game. This may be done with a minimum amount of information. Since each degree of freedom may be limited to only two states only one bit may be required, for example. More bits may be used, to provide additional robustness, for example.

The wireless (CDMA) packet operation allows for a variety of rate sets. The interface may also allow for essentially two different frame sizes for each rate set (half rate frames and full rate frames). Other frames may not be considered relevant if they are used for null bits during times of no activity, however, they may be used if appropriate, for example. Thus, while persons of ordinary skill may consider them not to be useful, they may be used as part of the present invention, if appropriate. By correlating the number of degrees of freedom for game play (which may be less than about 20 for a typical application) with the required latency (preferably less than about 300 ms/round trip) and the maximum number of interactive players (preferably about 8), parameters for a service that is tailored to the wireless (CDMA) network using rate set 1, half rate frames may be determined. This may allow for 6 updates (one update per frame) per second from the game server to all the users, and 3 updates per second from the handheld game device, for example. This will allow the users to interact in a very near real-time feel, and keep latency levels near that of the wireless (CDMA) networks intrinsic latency of 300 ms. Configured in this manner, the frames may be of sufficient size to carry all the needed information for updates to and from the server.

Bandwidth usage may be a critical limiting parameter in current wireless communications networks. In order to conserve bandwidth, header compression may be used for the IP network and employed by the interactive game service. This can be accomplished using conventional technologies, such as TCP and/or UDP for example.

The game server 200 may keep track of inputs from each individual player and "broadcast" them to the users. Server 200 may synchronize each users' state. In a preferred embodiment of the present invention, server 200 may transmit substantially only updates based on actual change of state of a degree of freedom. Server 200 may schedule updates such that the minimum amount of latency may be achieved (e.g., send an update every 150 ms regardless of whether or not a state change of a player has been registered).

Based upon the configuration described above, the amount of bandwidth that may be dedicated to the interactive application can be determined. A CDMA network of the type deployed in Assignee's Cricket® branded service offerings in various markets in the United States may be used. Cricket® brand voice service may be based on about 5.2 kbps (13 kx40% utilization). It is estimated that the cost of Cricket® voice service may be substantially lower than industry average cost. Using the Cricket® network, therefore, may enable interactive services to be provided at reduced cost.

By way of example, according to an embodiment of the present invention as shown in FIG. 2, using Rate Set 1 and transferring data the full frame rate, the maximum transmission rate of 20 bytes of data required to accommodate 20 degrees of freedom would equate to 50 frames/sec. This equates to a data payload of 134 bits. At a half frame rate, 10 bytes of data would also equate to 50 frames/sec, at a data payload of only 67 bits. Some bits (e.g., 26 bits) may be allocated to overhead bits, leaving the balance that is available for data payload (108 and 41 bits, respectively).

Using Rate Set 2, and transferring data using a full frame rate, a maximum transmission rate of 33 bytes of data at 50 frames/sec. equates to a data payload of 238 bits. At a half frame rate, 17 bytes of data, at 50 frames/sec. equates to a data payload of 119 bits. Some bits (e.g., 26 bits) may again be allocated to overhead bits, leaving the balance available for data payload (212 and 93 bits, respectively). At 3 hours of play per day, under Rate Set 1: 4.5 full frames per second (9 half rate frames) could be transferred while staying within available bandwidth. Under Rate Set 2, 2.5 full frames per second (5 half rate frames) could be transferred while staying within bandwidth. Quarter and eighths rate frames, as well as other suitable frame rates could also be employed with the present invention.

According to an aspect of the present invention, the interactive application may offer a user twenty (20) degrees of freedom, and two (2) states per each degree of freedom. This application requires a maximum of 20 bits to update status within the game, even if all of the degrees of freedom change. On average, it is believed that only 8 degrees of freedom will typically change per second. In order to update the status of the play, therefore, the update will require each player to supply information about each degree of freedom plus address bits. For example, for an 8 player game, about up to about 170 bits would be required to update the status of play, provided all degrees of freedom change, for all players. Updates preferably would be provided at half the rate of the round trip delay, or 6 per second. Assuming 8 degrees of change per player, per second, to update 6 times per second requires only 15 bits per update, which easily fits into the half rate frame of Rate Set 1, as described above.

With respect to system architecture, according to an aspect of the present invention, substantially only change of state information needs be transmitted between the handheld device 300 and the network 100. The interactive game application software may be resident on the hand-held device, and not on the network 100 or server 200. Game downloads may occur during low utilization periods, such as at night for example. The user could request a download and it would be ready the next morning, for example, having occurred during the hours when network traffic is lightest and more bandwidth is available for low priority uses.

In addition, the method and system of the present invention may allow 6 updates from server per second to players. This enables the system to conserve bandwidth while also limiting latency. Using half rate frames also minimizes air link utilization, conserving bandwidth. This leaves 3 half rate frames per second for each player to upload their change of state. The system and method may use maximum available header compression to eliminate as many bits as possible. Various algorithms, of the type well known in the art, may be provided as part of the game software 400 that is downloaded, and resident on the device, and in the game server. According to an aspect of the present invention, game server 200 may track players simultaneously, but updates per the schedule (6 times per second). This can be adjusted downward for other types of games requiring less movement and action, for example.

It will be apparent to persons of ordinary skill in the art that modification and variations may be made in the present invention, and in particular in the process of data transfer between the network 100 and hand-held device 300. For example, various header compression protocols (such as TCP/IP, UDP, and others may be used). Other techniques, known in the art but that were not employed in wireless interactive applications may be used to conserve bandwidth. Other interfaces may be used, such as the interface or the IWF network interface, as shown in FIG. 1. In addition, the network server 200, could be connected to the L interface to save bandwidth. IP addressing may be maintained in a minimal fashion, as necessary to support the application. Additional steps may also be taken to ensure that IP packets translate into CMDA frames as required.

Figure 3:
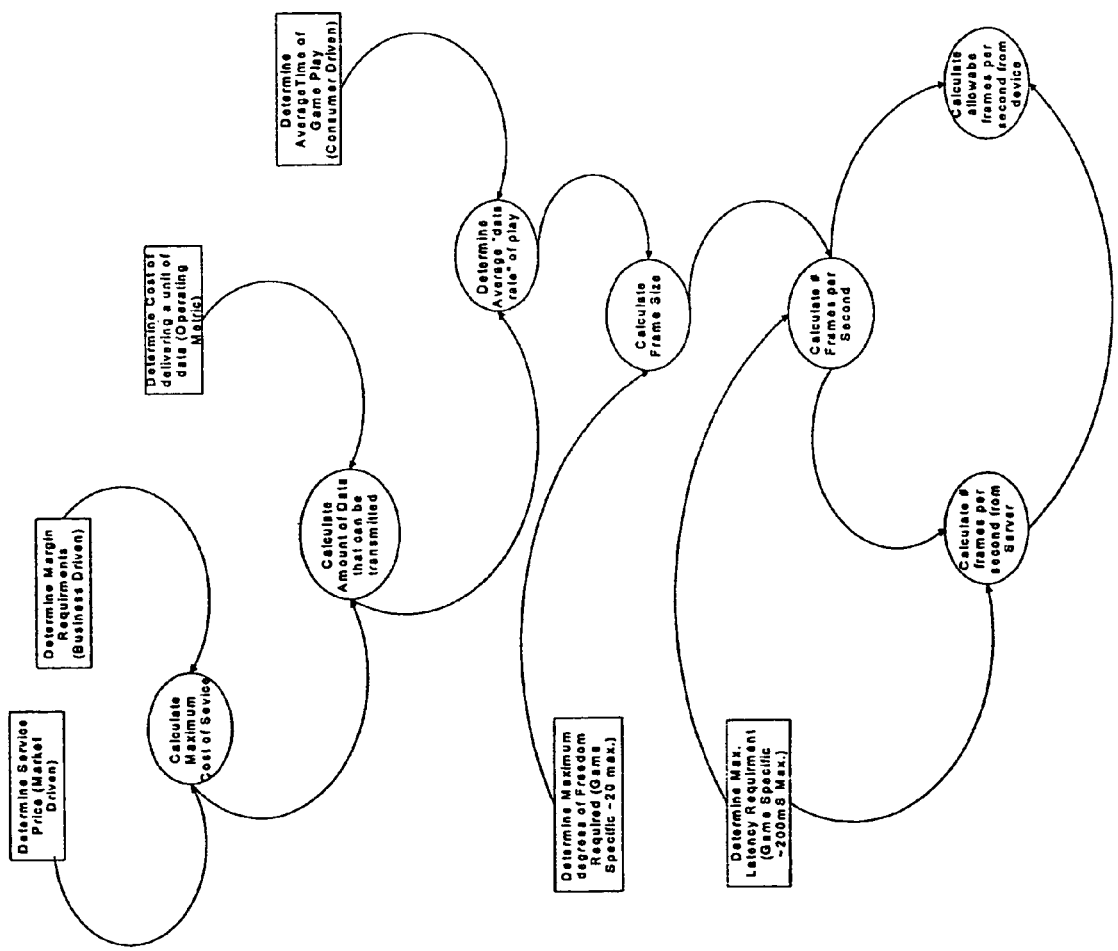
FIG. 3 is a flowchart depicting a method for providing one or more wireless interactive applications according to the present invention.
Figure 4:
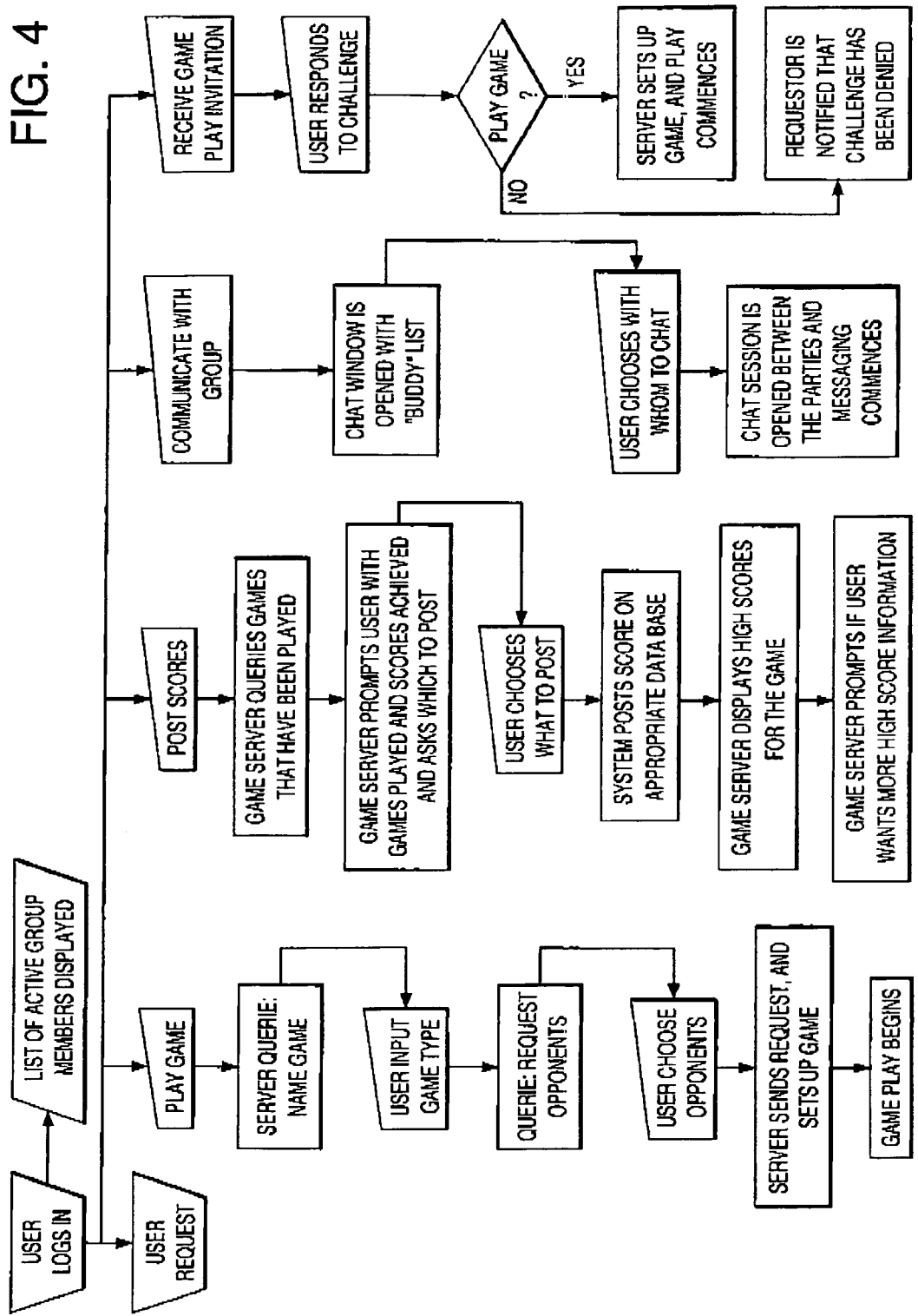
FIG. 4 is a flowchart depicting the steps in the overall method according to one embodiment of the present invention.

FIG. 3 illustrates the process of providing a system for providing one or more wireless interactive applications to one or more users according to an aspect of the present invention. Initially, the service price and margin requirements may be determined in order to calculate a maximum cost of service. Next, the amount of data that can be transmitted may be calculated based upon a determination of the cost of delivering a unit of data. The average "data rate" of play may be determined based upon the average time of game play. The system according to the present invention may further determines a maximum degrees of freedom required based on the specific game being played. This enables a calculation of an optimal frame size. Also based on the specific game being played, the maximum latency requirement may be determined. For fast-paced games, less latency may be tolerated. Conversely, for slow-paced games, more latency may be tolerated. This determination enables a calculation of the allowable frames per second delivered to and from the server 200.

Figure 5:
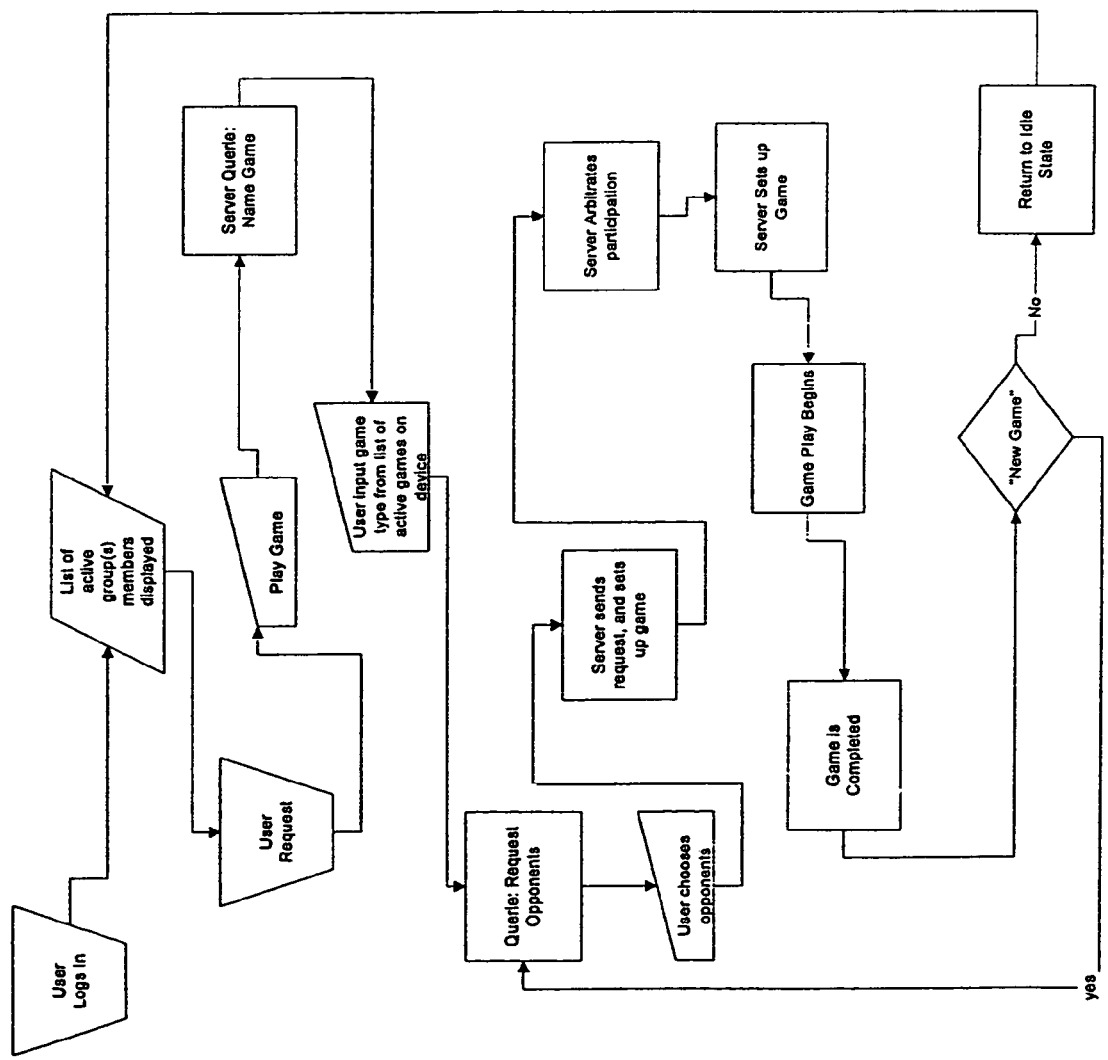
FIG. 5 is a flowchart depicting the steps of a user selecting to play a game according to one embodiment of the present invention.
Figure 6:
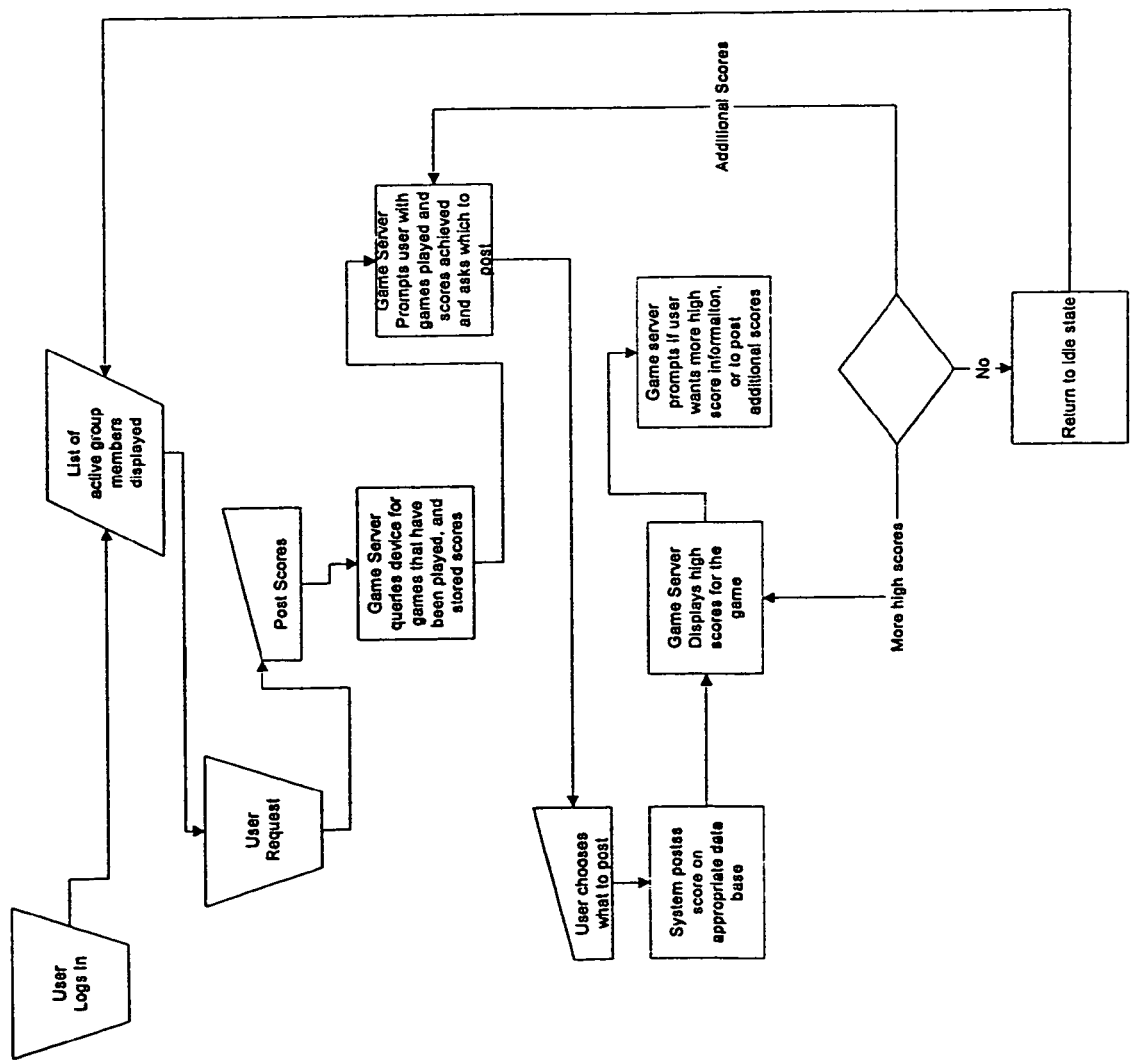
FIG. 6 is a flowchart depicting the steps of a user selecting to post scores according to one embodiment of the present invention.
Figure 7:
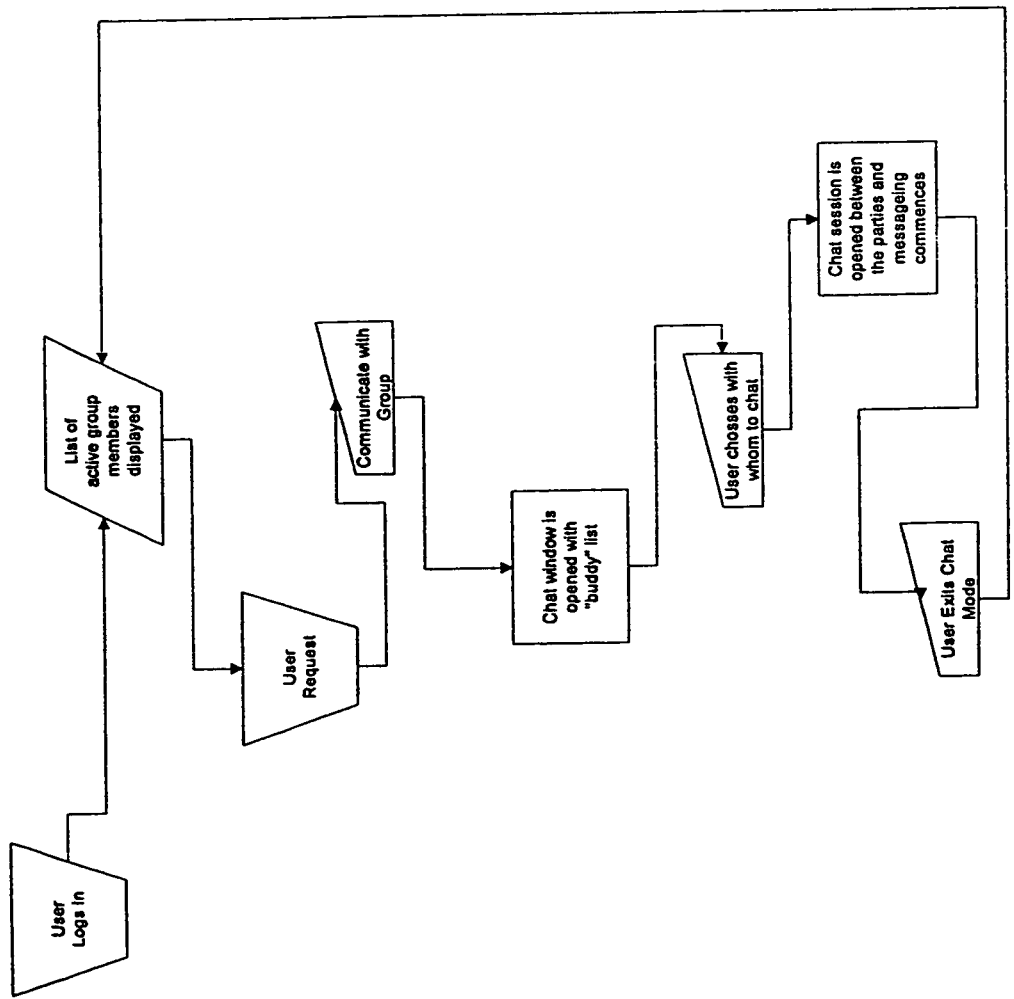
FIG. 7 is a flowchart depicting the steps of a user selecting to communicate with a group of users according to one embodiment of the present invention.

FIGS. 4 through 8 illustrate flowcharts depicting various steps involved in the method according to several aspects of the present invention. FIG. 5 illustrates a flowchart depicting the steps of a user selecting to play a game. FIG. 6 illustrates a flowchart depicting the steps of a user selecting to post scores. FIG. 7 illustrates a flowchart depicting the steps of a user selecting to communicate with a group of users according to one embodiment of the present invention. FIG. 8 illustrates a flowchart depicting the steps of a user receiving an invitation to play a game according to one embodiment of the present invention.

The system and method of the present invention may be fully compatible and usable in conjunction with PC based games, as well as Internet applications, and TV-based games. In addition, service employing the system and method of the present invention may be offered as a flat rate offering in conjunction with services such as Assignee's Cricket$^{SM}$ wireless communications service. Such services may be offered on a prepaid billing service for game purchase. In addition, scores may be posted through the wireless network in a number of locations. Numerous other variations and modification will be apparent to persons of ordinary skill that will facilitate the delivery of wireless interactive applications, at high level of graphic quality, while more efficiently using network bandwidth and resources than prior known systems and methods. Thus, it is intended that the present invention include the variations and modification that may be used in conjunction with them, provided they come within the scope of the appended claims and their equivalents.

What is claimed is:

1. A system for providing one or more interactive applications to one or more users via a wireless communications network, said system comprising:
   one or more servers cooperating with said network to download one or more interactive applications over the wireless communications network to one or more wireless access devices each corresponding to at least one of said users; and
   the one or more wireless access devices configured to execute at least one of the one or more interactive applications in response to a request received over said wireless communications network,
   wherein an interactive application is initiated in response to a request received over the wireless communication network, and state information is cached corresponding the interactive application for transmission over the wireless communication network to a server at a predetermined interval, and
   wherein the cached state information is communicated to the server in accordance with the predetermined interval, the cached state information indicating changes in state of one or more degrees of freedom associated with the interactive application, wherein each degree of freedom includes multiple states, and storing, in a memory, information relating to changes in state relating to the one or more degrees of freedom caching the state information, wherein a maximum of the one or more degrees of freedom is determined based on a specific game being played to enable a dynamic calculation of an optimal frame size, wherein a maximum latency for a fast-paced interactive application or a slow-paced interactive application is determined based on the specific game being played to further enable a calculation of allowable frames per second to and from the server.

2. The system of claim 1, wherein the one or more wireless access devices are provided with access to wireless service over said wireless communications network,
   wherein the one or more servers are configured to select a data rate of providing to the one or more wireless access devices updates associated with the downloaded one or more interactive applications
   wherein communications are received from the server, indicative of synchronization of the interactive application and cached state information to at least one of said one or more degrees of freedom, and updates at a data rate are received as selected by the server, the updates associated with the interactive application,
   wherein said one or more interactive applications comprise graphics, wherein at least one of said wireless access devices comprises a telephone, wherein each said wireless access device comprises a microprocessor, and
   wherein the interactive application comprises an interactive gaming application.

3. The system of claim 1, wherein said one or more users comprises a plurality of simultaneous users, wherein said plurality of users comprises three or more users,
   wherein at least a portion of communications from said network to at least one of said wireless access device is at a full frame rate or a half frame rate, wherein said application offers each of said users at least three degrees of freedom, and
   wherein said application is substantially stored on at least one of said wireless access devices.

4. The system of claim 1, wherein the one or more wireless access devices are provided with access to wireless service over said wireless communications network based on a fixed fee subscription, wherein the fixed fee subscription for wireless service is utilized for actions independent of downloading of content, and wherein the fixed fee subscription is independent of the one or more interactive applications downloaded over said wireless communication network, wherein the flat-rate further comprises a pre-paid, monthly rate offering provided in conjunction with one or more other wireless communications services.

5. The system of claim 1, wherein the request further comprises:
   an anonymous challenge, wherein the wireless service over said wireless communications network includes text messaging, and
   wherein the one or more servers are configured to provide at least one update per second to the one or more wireless access devices, wherein the one or more servers are further configured to prioritize communications to the one or more wireless access devices.

6. The system of claim 1, wherein the communication of the cached state information to the server further comprises: representing, for each available degree of the one or more degrees of freedom, the state of the degree of freedom using a single bit.

7. The system of claim 1, wherein a service price and margin is determined to calculate a maximum cost of services, wherein an amount of data to be transmitted is calculated based on a determination of a cost of delivering a unit of data, wherein an average data rate is determined based on an average time of game play.

8. A method for executing an interactive application using a wireless communication device, said method comprising:
    initiating an interactive application in response to a request received over a wireless communication network;
    caching state information corresponding to the interactive application for transmission over the wireless communication network to a server at a predetermined interval; and
    communicating the cached state information to the server in accordance with the predetermined interval, the cached state information indicating changes in state of one or more degrees of freedom associated with the interactive application, wherein each degree of freedom includes multiple states, and storing, in a memory, information relating to changes in state relating to the one or more degrees of freedom caching the state information, wherein a maximum of the one or more degrees of freedom is determined based on a specific game being played to enable a dynamic calculation of an optimal frame size, wherein a maximum latency for a fast-paced interactive application or a slow-paced interactive application is determined based on the specific game being played to further enable a calculation of allowable frames per second to and from the server.

9. The method of claim 8, wherein the method further comprises:
    receiving communications, from the server, indicative of synchronization of the interactive application and cached state information to at least one of said one or more degrees of freedom; and
    receiving updates at a data rate selected by the server, the updates associated with the interactive applications,
    wherein said wireless communication device comprises a telephone and said method further comprises storing said software on said telephone, wherein each said wireless communication device comprises a microprocessor, and
    wherein the interactive application comprises an interactive gaming application.

10. The method of claim 8, wherein said interactive application comprises graphics, and wherein said receiving communications is at a full frame rate or a half frame rate.

11. The method of claim 8, wherein receipt of the executable instructions necessary to execute the interactive application is associated with a fixed fee subscription associated with providing access to a wireless service, the fixed fee subscription independent of the one or more interactive applications downloaded over said wireless communication network, wherein communicating the cached state information to the server further comprises representing, for each available degree of freedom, the state of the degree of freedom using a single bit.

12. The method of claim 8, further comprising:
    storing data being indicative of changes in state of the one or more degrees of freedom to be communicated via said wireless communication network; and
    storing data being indicative of received communications indicative of synchronization of said interactive application and cached updates to at least one of the one or more degrees of freedom.

13. The method of claim 8, wherein a service price and margin is determined to calculate a maximum cost of services, wherein an amount of data to be transmitted is calculated based on a determination of a cost of delivering a unit of data, wherein an average data rate is determined based on an average time of game play.

14. A non-transitory computer-readable medium comprising instructions that, when executed by a data processing apparatus, cause the data processing apparatus to perform one or more operations comprising:
    initiating an interactive application in response to a request received over a wireless communication network;
    caching state information corresponding to the interactive application for transmission over the wireless communication network to a server at a predetermined interval; and
    communicating the cached state information to the server in accordance with the predetermined interval, the cached state information indicating changes in state of one or more degrees of freedom associated with the interactive application, wherein each degree of freedom includes multiple states, and storing, in a memory, information relating to changes in state relating to the one or more degrees of freedom caching the state information, wherein a maximum of the one or more degrees of freedom is determined based on a specific game being played to enable a dynamic calculation of an optimal frame size, wherein a maximum latency for a fast-paced interactive application or a slow-paced interactive application is determined based on the specific game being played to further enable a calculation of allowable frames per second to and from the server.

15. The non-transitory computer-readable medium of claim 14, wherein the one or more operations further comprise:
    receiving, from the server; communications indicative of synchronization of the interactive application and cached state information to at least one of said one or more degrees of freedom; and
    receiving updates at a data rate selected by the server, the updates associated with the interactive applications,
    wherein the interactive application includes instructions or graphics that are received by a wireless communication device over the wireless communication network and are stored in the memory associated with the wireless communication device,
    wherein said wireless communication device comprises a telephone and said method further comprises storing said software on said telephone, wherein each said wireless communication device comprises a microprocessor,
    wherein said receiving communications is at a full frame rate or a half frame rate, and
    wherein said interactive application comprises an interactive gaming application.

16. The non-transitory computer-readable medium of claim 14, wherein receipt of the executable instructions necessary to execute the interactive application is associated with a fixed fee subscription associated with providing access to a wireless service, the fixed fee subscription independent of the one or more interactive applications downloaded over said wireless communication network, wherein communicating the cached state information to the server further comprises: representing, for each available degree of freedom, the state of the degree of freedom using a single bit.

17. The non-transitory computer-readable medium of claim 14, wherein the one or more operations further comprise:
 storing data being indicative of changes in state of the one or more degrees of freedom to be communicated via said wireless communication network; and
 storing data being indicative of received communications indicative of synchronization of said interactive application and cached updates to at least one of the one or more degrees of freedom.

18. The non-transitory computer-readable medium of claim 14, wherein a service price and margin is determined to calculate a maximum cost of services, wherein an amount of data to be transmitted is calculated based on a determination of a cost of delivering a unit of data, wherein an average data rate is determined based on an average time of game play.

19. A wireless communication device for executing an interactive application responsive to a user request and in cooperation with a wireless communication network, said device comprising:
 a storage medium configured to store the interactive application received over the wireless communication network; and
 a processor configured to initiate the interactive application in response to a request received over the wireless communication network, and cache state information corresponding the interactive application for transmission over the wireless communication network to a server at a predetermined interval,
 wherein the cached state information is communicated to the server in accordance with the predetermined interval, the cached state information indicating changes in state of one or more degrees of freedom associated with the interactive application, wherein each degree of freedom includes multiple states, and storing, in a memory, information relating to changes in state relating to the one or more degrees of freedom caching the state information, wherein a maximum of the one or more degrees of freedom is determined based on a specific game being played to enable a dynamic calculation of an optimal frame size, wherein a maximum latency for a fast-paced interactive application or a slow-paced interactive application is determined based on the specific game being played to further enable a calculation of allowable frames per second to and from the server.

20. The wireless communication device of claim 19, wherein the wireless communication device is provided with access to wireless service over the wireless communication network in association with a flat-rate charge,
 wherein the interactive application comprises an interactive gaming application, and wherein the wireless service comprises a wireless gaming service, and
 wherein the processor is further configured to initiate game play based upon an interaction with a text message, wherein the processor is further configured to receive at least one update per second from the server.

21. The wireless communication device of claim 19, wherein said wireless communication device comprises a telephone and said method further comprises storing said software on said telephone, wherein each said wireless communication device comprises a microprocessor,
 wherein said receiving communications is at a full frame rate or a half frame rate, and
 wherein said interactive application comprises graphics.

22. The wireless communication device of claim 19, wherein the initiation of the interactive application is associated with a fixed fee subscription associated with providing access to a wireless service, the fixed fee subscription independent of the one or more interactive applications downloaded over said wireless communication network.

23. The wireless communication device of claim 19, wherein communicating the cached state information to the server further comprises: representing, for each available degree of freedom, the state of the degree of freedom using a single bit.

24. The wireless communication device of claim 19, wherein the storage medium is further configured to:
 store data being indicative of changes in state of the one or more degrees of freedom to be communicated via said wireless communication network; and store data being indicative of received communications indicative of synchronization of said interactive application and cached updates to at least one of the one or more degrees of freedom.

25. The wireless communication device of claim 19, wherein a service price and margin is determined to calculate a maximum cost of services, wherein an amount of data to be transmitted is calculated based on a determination of a cost of delivering a unit of data, wherein an average data rate is determined based on an average time of game play.

* * * * *